(No Model.)
W. J. CLARK.
FEED CUTTING MACHINE.
No. 581,062. Patented Apr. 20, 1897.
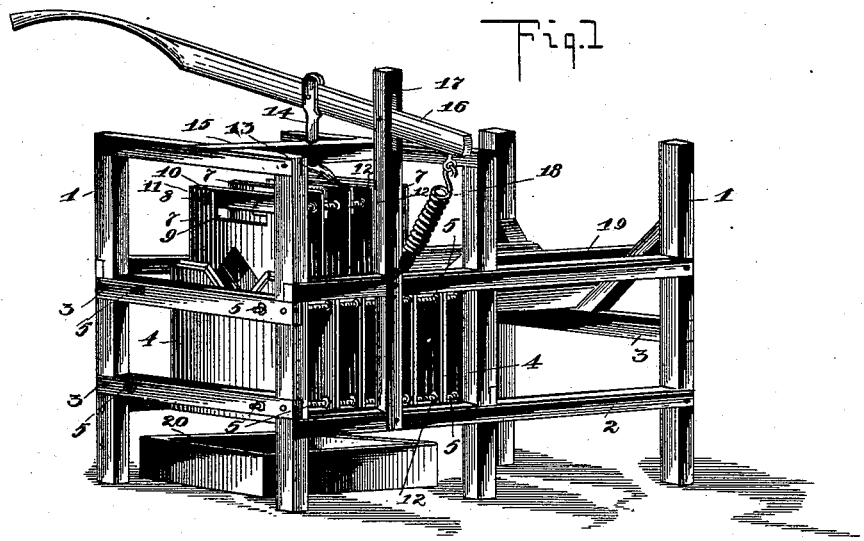
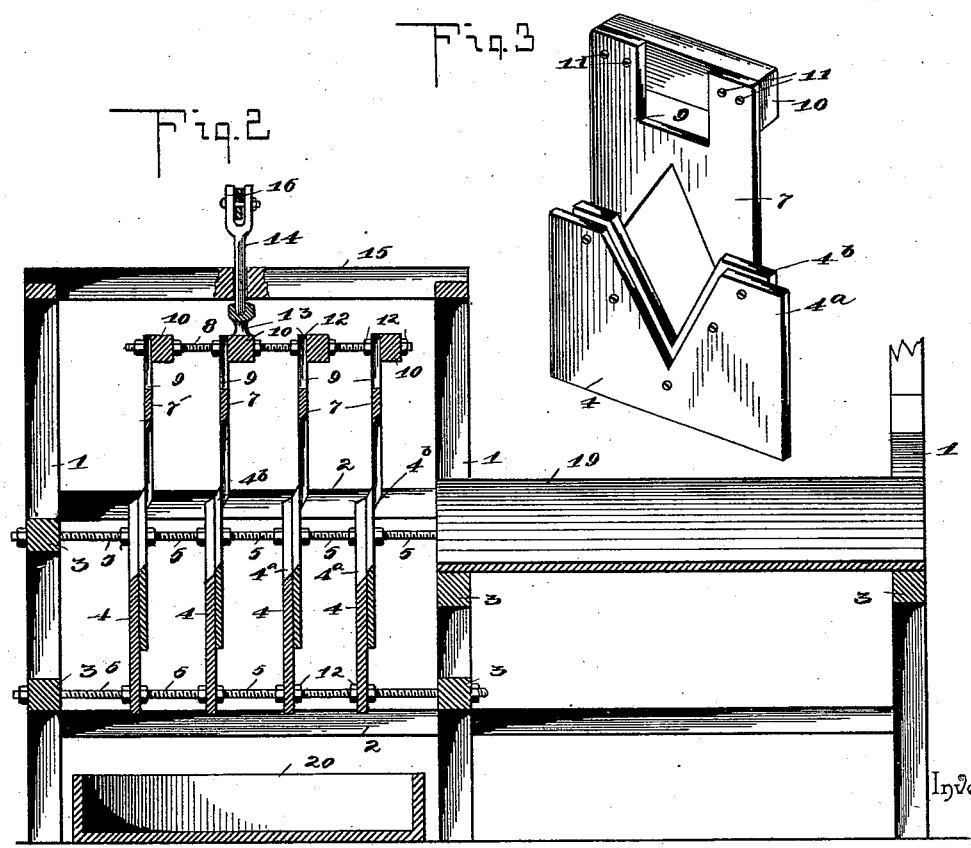
Witnesses
Inventor
William J. Clark
By his Attorneys,
C. A. Snow & Co.

UNITED STATES PATENT OFFICE.

WILLIAM J. CLARK, OF GROVETON, TEXAS.

FEED-CUTTING MACHINE.

SPECIFICATION forming part of Letters Patent No. 581,062, dated April 20, 1897.

Application filed April 8, 1896. Serial No. 586,760. (No model.)

*To all whom it may concern:*

Be it known that I, WILLIAM J. CLARK, a citizen of the United States, residing at Groveton, in the county of Trinity and State of Texas, have invented a new and useful Feed-Cutting Machine, of which the following is a specification.

My invention relates to feed-cutters, and has for its object to provide a plural-knife apparatus so constructed as to facilitate the cutting of grain, and, furthermore, to provide means for relatively adjusting the stationary and movable knives.

Further objects and advantages of this invention will appear in the following description, and the novel features thereof will be particularly pointed out in the appended claims.

In the drawings, Figure 1 is a perspective view of a feed-cutting machine constructed in accordance with my invention. Fig. 2 is a longitudinal section. Fig. 3 is a detail view of a pair of operating-knives.

Similar numerals of reference indicate corresponding parts in all the figures of the drawings.

The frame of the feed-cutting device embodying my invention includes uprights 1, connected by longitudinal bars 2 and transverse bars 3, said uprights being extended below the lower connecting-bars to form supports. A plurality of stationary knives 4, arranged transversely of the frame and spaced apart a distance equal to the desired length of the cuts, are supported by longitudinal rods 5, which are terminally secured to front and intermediate cross-bars 3. I preferably employ four of these supporting-rods, located, respectively, near the corners of the knives, and the knives are held in the desired relative positions by means of adjusting devices 6, consisting of nuts arranged upon opposite sides of the planes of the knives, said rods being threaded. Arranged for coöperation with the stationary knives are the movable or reciprocating knives 7, connected by threaded rods 8 for simultaneous movement, the upper edges of the knives being cut away, as shown at 9, and having said openings spanned by stiffening-bars 10. Said bars are secured to the blades by means of screws 11 or similar fastening devices, and the knives are held at the desired intervals to correspond with those between the stationary knives by means of nuts 12, threaded upon said rods 8. Any desired frictional contact of the movable with the stationary knives may be secured by the adjustment of the said nuts or their equivalents.

Connected to the battery of reciprocatory knives by means of a cross-head 13, attached to one of the intermediate knives, is a stem 14, mounted in a suitable guide in the longitudinal bar 15, the upper end of said stem being bifurcated to receive the hand-lever 16, which is fulcrumed upon a standard 17, supported by the frame, and connected to the projecting extremity of said hand-lever is a return-spring 18 to elevate the reciprocatory knives when the hand-lever is released. Thus all of the knives are adjustable laterally by means of the connecting-rods and engaging nuts with the exception of that knife to which the lower extremity of the reciprocatory stem 14 is directly connected, said knife obviously being held from lateral adjustment by means of the stem, which is mounted in a fixed guide in the frame.

A feed trough or guide 19, preferably of V-shaped cross-sectional construction, is arranged longitudinally upon the frame to receive feed and guide it to the knives, and the cutting edges of the lower or stationary knives are V-shaped to agree with the cross-sectional construction of the trough. In the same way the cutting edges of the reciprocatory knives are of inverted-V shape, whereby as the movable knives descend they have a shearing action, and hence operate with equal efficiency upon the long feed, whether the latter is introduced in large or small quantities. Furthermore, said construction of knives prevents the displacement of the feed during the operation of the machine. The upward movement of the movable knives is limited by the contact of the cross-head with the guide-bar 15, and said knives cannot be elevated sufficiently to remove their lower edges from contact with the upper edges of the stationary knives. In other words, the contiguous side portions of the stationary and movable knives permanently overlap and are in contact, whereby the stationary knives form guides for the movable knives to prevent relative displacement.

In practice I prefer to construct the stationary knives of body portions $4^a$, consisting of metal plates cut away to form V-shaped notches at their upper edges and detachable knife-edges $4^b$, which may be replaced when worn to such an extent as to prevent further sharpening and which also may be detached to facilitate sharpening.

A suitable receptacle 20 is preferably arranged beneath the stationary knives to catch the cut feed which drops vertically downward thereinto, being guided by the parallel vertical knives.

It will be understood that any desired number of coöperating stationary and movable knives may be employed to vary the capacity of the machine.

Various changes in the form, proportion, and the minor details of construction may be resorted to without departing from the spirit or sacrificing any of the advantages of this invention.

Having described my invention, what I claim is—

1. A feed-cutting machine having a supporting-frame, a series of stationary vertical knives spaced at regular intervals, a series of connected laterally-adjustable knives mounted for reciprocatory movement parallel with the planes of the stationary knives, a single stem attached to the upper edge of one of the reciprocatory knives and mounted in a vertical guide in the frame, whereby all of the knives, with the exception of that to which the stem is connected, may be adjusted, and a spring-actuated operating-lever to which said stem is pivotally connected, the reciprocatory knives being normally held elevated by said lever, substantially as specified.

2. A feed-cutting machine having a supporting-frame, a series of stationary vertical knives, horizontal rods supporting said knives, means for adjusting the knives upon said rods to vary the intervals therebetween, a reciprocatory stem mounted for vertical movement in a guide in the frame, operating means connected to said stem, and a series of connected reciprocatory knives adapted to coöperate respectively with the stationary knives, the connection between the same consisting of transverse rods and means for adjusting the knives on the rods, one of the knives being connected to the lower extremity of said reciprocatory stem, whereby the remaining knives may be independently adjusted, substantially as specified.

3. In a feed-cutting machine, the combination with a supporting-frame, of longitudinally-disposed supporting-rods, a plurality of stationary knives mounted for longitudinal movement upon said supporting-rods, nuts threaded upon the supporting-rods upon opposite sides of the plane of each knife to secure the latter in the desired position, a series of coöperating movable knives, longitudinally-disposed rods connecting the movable knives and fitted with adjusting-nuts arranged respectively upon opposite sides of the planes of said knives, and means for operating the movable knives, substantially as specified.

W. J. CLARK.

Witnesses:
C. J. HINSON,
E. L. VICKREY.